(12) United States Patent
Umemoto et al.

(10) Patent No.: US 7,163,667 B2
(45) Date of Patent: Jan. 16, 2007

(54) PRODUCTION PROCESS FOR OXIDE MAGNETIC MATERIAL AND OXIDE MAGNETIC MATERIAL

(75) Inventors: Takashi Umemoto, Hirakata (JP); Hideki Yoshikawa, Takarazuka (JP); Keiichi Kuramoto, Kadoma (JP); Hitoshi Hirano, Nishinomiya (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 10/346,938

(22) Filed: Jan. 17, 2003

(65) Prior Publication Data

US 2003/0138630 A1 Jul. 24, 2003

(30) Foreign Application Priority Data

Jan. 21, 2002 (JP) .................................. 2002-011300
Jan. 7, 2003 (JP) .................................. 2003-001313

(51) Int. Cl.
*C01G 49/02* (2006.01)

(52) U.S. Cl. .................... 423/151; 423/23; 423/138; 423/152; 423/155; 423/594.2; 423/594.6; 423/594.16; 423/594.19; 423/604; 423/633

(58) Field of Classification Search ............ 423/23, 423/138, 151, 152, 155, 594.1, 594.2, 594.5, 423/604, 594.6, 633, 594.16, 594.19; 428/402, 428/546, 548, 552, 557, 702; 419/23, 30, 419/31, 33, 53, 54, 55
See application file for complete search history.

(56) References Cited

U.S. PATENT DOCUMENTS

| | | | | | |
|---|---|---|---|---|---|
| 4,764,300 | A | * | 8/1988 | Hibst et al. | 252/62.58 |
| 5,686,137 | A | * | 11/1997 | Ogawa et al. | 427/128 |
| 6,139,766 | A | * | 10/2000 | Taguchi et al. | 252/62.57 |
| 6,558,566 | B1 | * | 5/2003 | Ono et al. | 252/62.6 |
| 6,623,879 | B1 | * | 9/2003 | Okano et al. | 428/701 |
| 6,660,179 | B1 | | 12/2003 | Umeda et al. | |
| 6,736,990 | B1 | * | 5/2004 | Aoki et al. | 252/62.6 |
| 6,737,012 | B1 | * | 5/2004 | Nakano et al. | 264/611 |
| 6,749,768 | B1 | * | 6/2004 | Endo et al. | 252/62.63 |
| 6,773,620 | B1 | * | 8/2004 | Umemoto et al. | 252/62.63 |
| 2003/0138630 | A1 | * | 7/2003 | Umemoto et al. | 428/402 |
| 2003/0148094 | A1 | * | 8/2003 | Umemoto et al. | 428/329 |

FOREIGN PATENT DOCUMENTS

| | | |
|---|---|---|
| JP | 60 106114 | 6/1985 |
| JP | 06 333743 | 12/1994 |
| JP | 09-167703 | 6/1997 |
| JP | 2002-260912 | 9/2002 |

OTHER PUBLICATIONS

D. R. Smith et al., "Determination of Effective Permittivity and Permeability of Metamaterials from Reflection and Transmission Coefficients", Physical Review B, vol. 65, 195104, 1–5, Apr. 19, 2002.*

Ramanujan, "Nanostructured Electronic and Magnetic Materials", Sadhana, vol. 28, Parts 1 & 2, pp. 81–96, Feb./Apr. 2003.*

Andy Chow, "Inductor Core Material: The Heart of an Inductor", Power Elecronics and Technology, Jan. 1, 2004. (http://powerelectronics.com/mag/power_inductor_core_material/).*

* cited by examiner

*Primary Examiner*—H. Thi Le
(74) *Attorney, Agent, or Firm*—W. F. Fasse; W. G. Fasse (57) ABSTRACT

A production process for an oxide magnetic material comprising the steps of blending raw material powder so as to take the composition of a hexagonal ferrite including: at least one kind of an element A selected from the group consisting of Ba, Sr and Ca; Co and Cu; Fe; and O; and sintering said blended powder at a temperature lower than 1000° C.

13 Claims, 5 Drawing Sheets

PRODUCTION PROCESS FOR OXIDE MAGNETIC MATERIAL AND OXIDE MAGNETIC MATERIAL

BACKGROUND OF THE INVENTION

1. Field of the Invention

The present invention relates to a production process for an oxide magnetic material capable of being used in a stacked composite device and an inductor and to the oxide magnetic material.

2. Related Art

In recent years, a demand for downsizing has been increasingly built up in a small-sized electronic device such as a portable telephone. In such a situation, plural electronic circuits constituting an electronic device have been integrated into a stacked composite device on a single chip for mounting on a main substrate.

Figure 7:
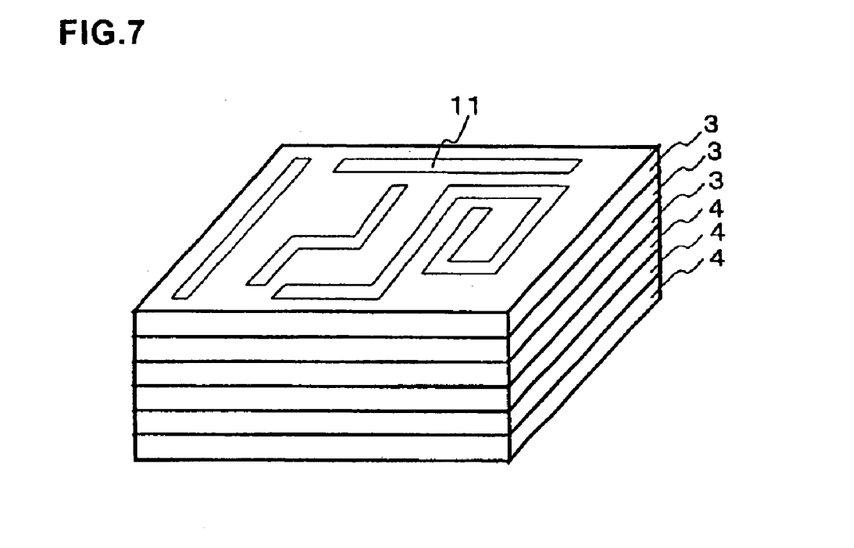
FIG. 7 is a perspective view showing an example of stacked composite device.
Figure 8:
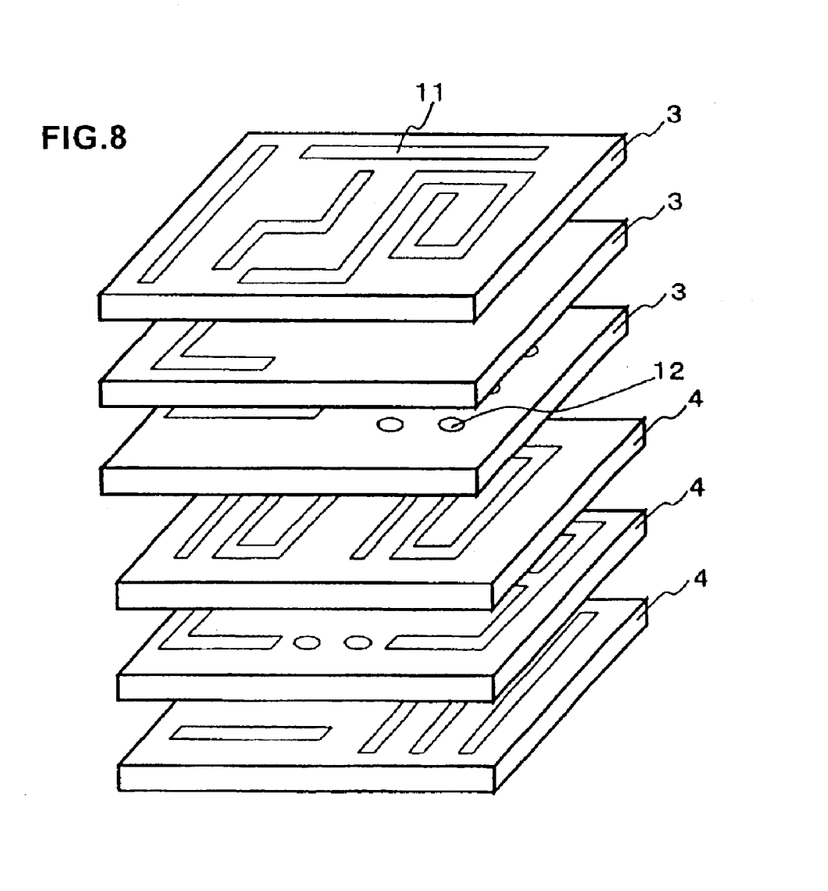
FIG. 8 is an exploded, perspective view showing the example of stacked composite device.

FIG. 7 is a perspective view showing an example of stacked composite device and FIG. 8 is an exploded perspective view thereof. A stacked composite device, as shown in FIGS. 7 and 8, is constructed by stacking plural ceramic layers 3 and 4. Plural circuit element patterns 11 each including an inductor or a capacitor are formed on surfaces of the ceramic layers 3 and 4. The circuit element patterns 11 are connected to each other by via holes 12 passing through the ceramic layers 3 and 4 or by conductor patterns formed on the ceramic layers 3 and 4, thereby to construct an electronic circuit such as a filter.

It is proposed that in a case where the ceramic layers 3 are magnetic ceramic layers and the ceramic layers 4 are dielectric ceramic layers, a pattern (L pattern) constituting an inductor is formed on each of the magnetic ceramic layers 3 and a pattern (C pattern) constituting a capacitor is formed on each of the dielectric ceramic layers 4 (Japanese Patent Laid Open No. S60-106114, Japanese Patent Laid Open No. H6-333743 and others).

Figure 9:
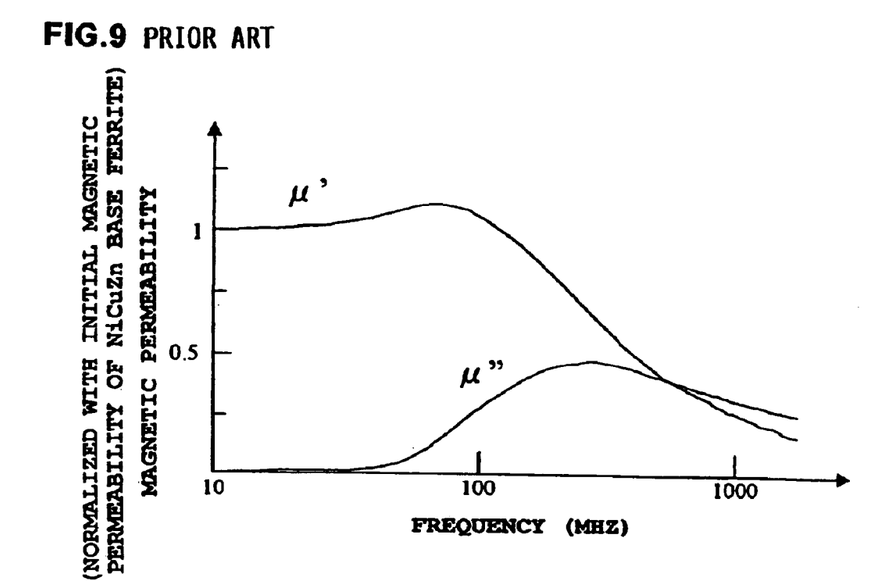
FIG. 9 is a graph showing frequency characteristics of magnetic permeability of a prior art magnetic material (a NiCuZn base ferrite).

As magnetic materials used in such a stacked composite device and an inductor, there has been generally heretofore used: a NiCuZn base spinel type ferrite. FIG. 9 is a graph showing frequency characteristics of magnetic permeability of a NiCuZn base spinel type ferrite. In FIG. 9, there are shown normalized values of a real part $\mu'$ and an imaginary part $\mu''$ of a complex magnetic permeability with the $\mu'$ at 10 MHz as 1. As shown in FIG. 9, the real part $\mu'$ of a complex magnetic permeability takes a comparatively high value in a region up to as high as a value in the vicinity of 100 MHz.

As magnetic materials capable of adapting to higher frequencies, there can be named a hexagonal ferrite. The hexagonal ferrite includes crystal structures of phases which are analogous to each other, such as a Z type, a Y type, a W type and an M type. The phase of the Z type, among them, shows a comparatively high magnetic permeability and reduction in magnetic permeability is minimized in a region up to as high as the GHz band.

A prior art spinel ferrite such as that of NiCuZn base, as shown in FIG. 9, can be used in a region up to as high as 100 MHz, whereas a natural resonance occurs in a region of higher frequencies to decrease a real part $\mu'$ of magnetic permeability but to contrary to this, increase an imaginary part $\mu''$ thereof (which is a Snoek limit). Furthermore, in a prior art hexagonal ferrite having the Z type structure, reduction in magnetic permeability is minimized and excellent in a high-frequency characteristic in a region up to as high as the GHz band, whereas a crystallization temperature is as high as 1300° C. Since Ag and Cu as materials of a conductor pattern are molten at such a high temperature, a problem arises that the conductor pattern cannot be heated simultaneously with sintering of a magnetic material.

SUMMARY OF THE INVENTION

It is an object of the present invention to provide a production process for an oxide magnetic material, with the composition of a hexagonal ferrite and being small in loss in a high-frequency band; and an oxide magnetic material obtained by the production process.

A production process of the present invention includes: a step of blending raw material powder so as to take the composition of a hexagonal ferrite including: at least one kind of an element A selected from the group consisting of Ba, Sr and Ca; Co and Cu; Fe; and O (Oxygen); and a step of sintering the blended powder at a temperature lower than 1000° C.

The present inventors have found that by sintering the raw material powder blended so as to take the composition of a hexagonal ferrite at a temperature lower than 1000° C., which is lower than 1300° C. of a crystallization temperature of the hexagonal ferrite, an oxide magnetic material can be obtained that has magnetic permeability almost as high as the oxide magnetic material sintered at 1300° C. which is a crystallization temperature thereof, leading to the present invention. In the present invention, a sintering temperature is more preferably in the range of from 850 to 950° C., further more preferably in the range of from 880 to 920° C.

According to the present invention, since sintering can be performed at a temperature lower than 1000° C., magnetic material powder can be sintered in the co-existence of a conductor such as Ag or Cu, thereby enabling a stacked composite device, an inductor and others to be produced in simpler and easier process.

In a more preferable embodiment according to the present invention, after blending the above raw material powder, the blended powder is preliminarily sintered, followed by pulverizing of the obtained preliminarily sintered powder and the substantive sintering is performed after the pulverization. A temperature of the preliminary sintering is preferably higher than a temperature of the substantive sintering by 300° C. or more.

In the present invention, a molar ratio of elements of a hexagonal ferrite, which is a compositional ratio of the raw material powder obtained by blending, is preferably A:Co+Cu:Fe:O=1 to 6:1 to 6:30 to 38:57 to 60.

A limited aspect of the production process of the present invention includes: a step of blending raw material powder so as to take the composition of a hexagonal ferrite including: at least one kind of an element A selected from the group consisting of Ba, Sr and Ca; Co and Cu; Fe; and O, wherein a molar ratio of elements of the hexagonal ferrite composition is A:Co+Cu:Fe:O=1 to 6:1 to 6:30 to 38:57 to 60; a step of preliminarily sintering the raw material powder after blending, and pulverizing obtained preliminarily sintered powder; and a step of sintering the pulverized powder at a temperature lower than 1000° C., wherein a temperature of the preliminarily sintering is higher than a temperature of the sintering by 300° C. or more.

A magnetic material of the present invention is an oxide magnetic material produced by the production process of the present invention described above.

A magnetic material of the present invention has a feature that a real part $\mu'$ of a complex magnetic permeability is larger than an imaginary part μ" thereof at 1 GHz. Therefore, in an oxide magnetic material of the present invention, a loss can be suppressed in a region up to a high-frequency band beyond the Snoek limit.

Furthermore, a magnetic material of the present invention has a feature that in the magnetic material, there are included particles each of 10 μm or more in diameter and particles each of 1 μm or less in diameter in a mixed condition. The particles each of 1 μm or less in diameter are preferably present in the amount of 10 vol. % or more. Further, a mean diameter of the particles each of more than 1 μm in diameter is preferably 10 μm or more. In the present invention, a diameter of the magnetic material can be measured under observation by an electron microscope.

In the present invention, Cu is included as an element substituting Co. A degree of substitution of Co with Cu is preferably in the range of from 20 to 80 atomic %.

A limited aspect of a magnetic material of the present invention has a feature that the magnetic material includes particles each of 10 μm or more in diameter and particles each of 1 μm or less in diameter in a mixed condition.

DESCRIPTION OF THE PREFERRED EMBODIMENTS

Hereinafter, the present invention is described in more detail by reference to the Examples, which are not intended to limit the scope of the present invention.
(Experiment 1)

Raw material powders of BaO, CoO, CuO and $Fe_2O_3$ all with high purity were weighed so as to be 18, 6, 6 and 70 mol %, in terms of BaO, CoO, CuO and $Fe_2O_3$, respectively and then blended and pulverized with a ball mill using a pot and balls made of zirconia for 24 hours. Thereafter, the blended powder was preliminarily sintered at 1300° C. for 2 hours and the obtained preliminary sintered powder was further pulverized with a ball mill using a pot and balls made of zirconia for 24 hours.

A half of the powder of the oxide magnetic material obtained in a way described above was put into the ball mill together with a PVA base binder and an organic solvent and blended for 24 hours in a wet condition. Added amounts of the PVA-base binder and the organic solvent were 4 parts by weight and 50 parts by weight, respectively, relative to 100 parts by weight of the magnetic material powder. Thereafter, the wet blended powder was dried and screened to be molded into a ring-shaped body of 8 mm in outer diameter, 4 mm in inner diameter and 2 mm in height. The molded body was sintered at 900° C. for 2 hours. The obtained ring-shaped sample was subjected to measurement on magnetic permeability with an impedance analyzer.

Figure 5:
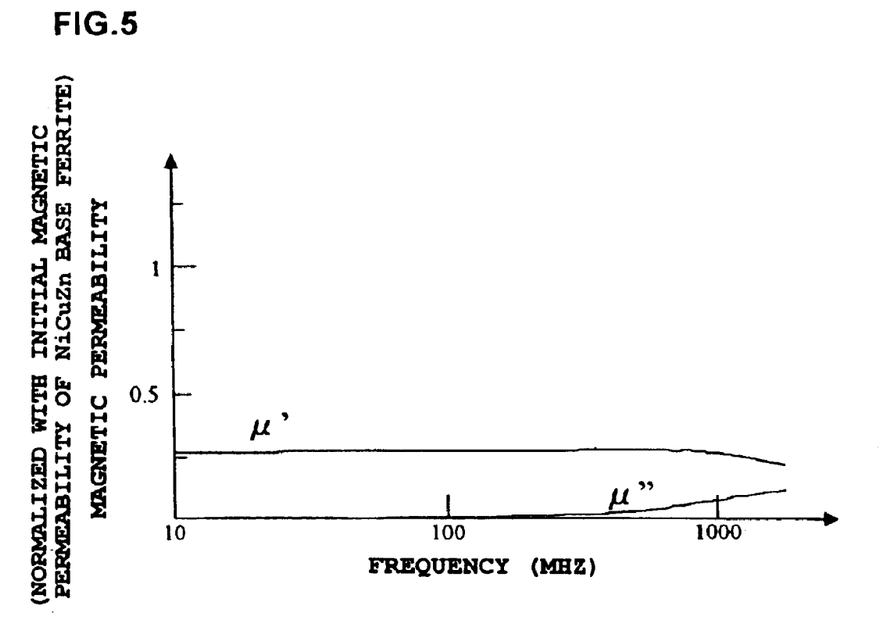
FIG. 5 is a graph showing frequency characteristics of an oxide magnetic material obtained in the example of the present invention.

FIG. 5 is a graph showing measurment results of magnetic permeability. In FIG. 5, values of magnetic permeability are normalized with an initial magnetic permeability of NiCuZn base spinel ferrite (a real part μ' of magnetic permeability at 10 MHz) as 1. In an oxide magnetic material obtained according to the present invention, as shown in FIG. 5, a real part μ' of magnetic permeability takes a high values in a region up to as high as 1 GHz (1000 MHz). Furthermore, it is understood that an imaginary part μ" of magnetic permeability shows almost no increase in a region up to as high as a value in the vicinity of 1 GHZ (1000 MHz). Therefore, it is understood the oxide magnetic material in this example can be used in the GHz band.

The magnetic material in the obtained molded body was confirmed to be hexagonal ferrites of the Y type structure ($Ba_2CoCuFe_{12}O_{22}$) and the Z type structure ($Ba_3CoCuFe_{24}O_{41}$) as the result of the X-ray diffraction analysis.

Figure 1:
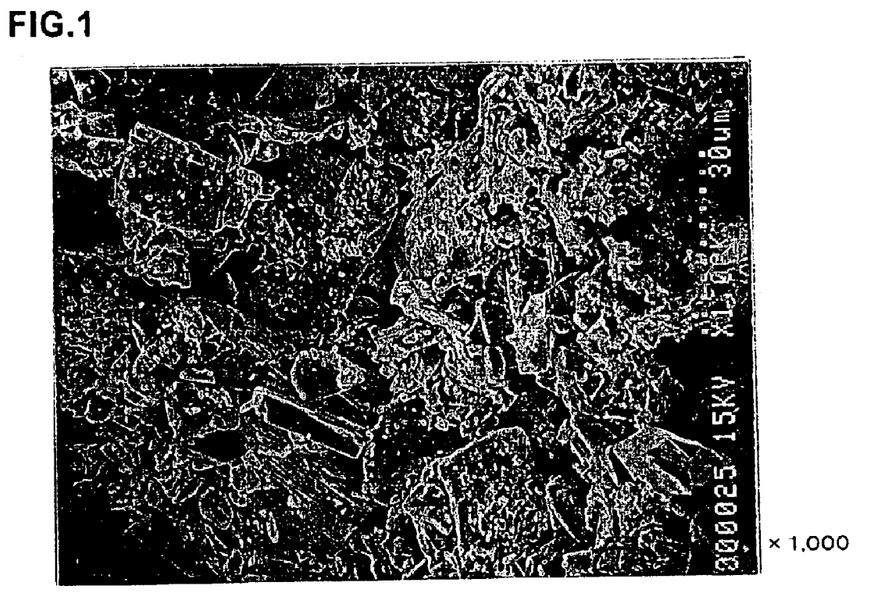
FIG. 1 is a photograph taken with a scanning electron microscope (with a magnification of ×1000) showing a sectional view of a molded body obtained in an example of the present invention.

Furthermore, a section of the obtained molded body was observed with a scanning electron microscope (SEM). In FIG. 1, there is shown a photograph taken with the scanning electron microscope (with a magnification of ×1000) at this time. As can be seen from the photograph of FIG. 1, fine particles each of 1 μm or less in diameter are present in a mixed condition among planar particles each of about 30 μm in diameter. The particles each of 1 μm or less in diameter are present in the amount of about 15 vol. %.

For comparison, sintering of ring-shaped bodies were performed at 1000° C., 1100° C., 1200° C. and 1300° C. as a sintering temperature to obtain molded bodies. In each sintering, the temperature was held for 2 hours. Magnetic permeability of the obtained molded bodies was measured using the impedance analyzer in a similar way to the case described above.

Figure 6:
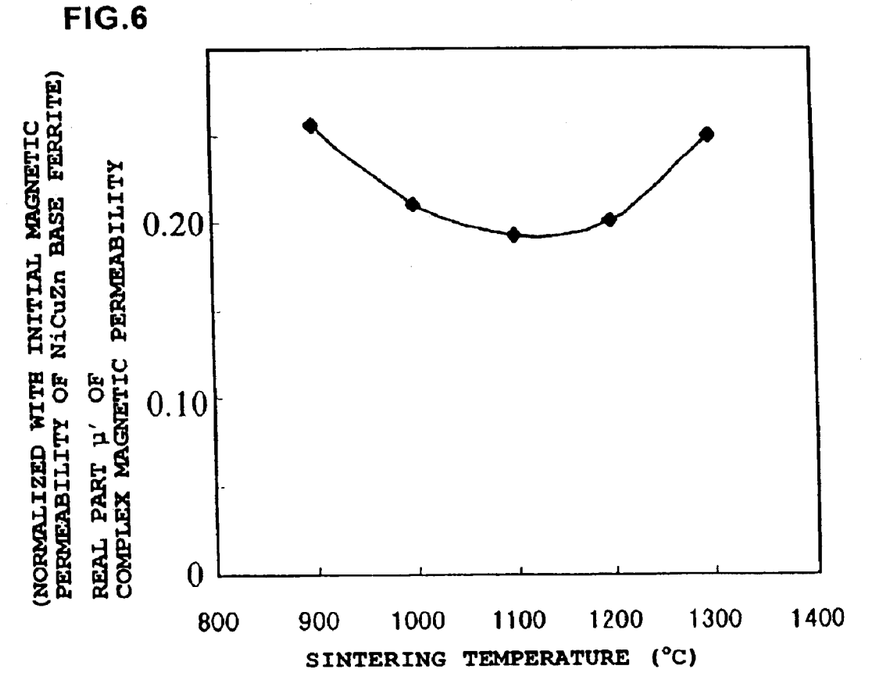
FIG. 6 is a graph showing a relationship between a sintering temperature and magnetic permeability.

FIG. 6 is a graph showing a real part μ' of magnetic permeability at 1 GHz (1000 MHz) of each of the molded bodies. Note that the values of μ' are normalized values in a similar way to those in FIG. 5.

As is clear from FIG. 6, it is understood that the molded body sintered at 900° C. according to the present invention shows magnetic permeability value at almost the same level as the molded body sintered at 1300° C.

Observation with SEM was performed on molded bodies sintered at temperatures of 1100° C. and 1300° C. in a similar way to the cases described above.

Figure 2:
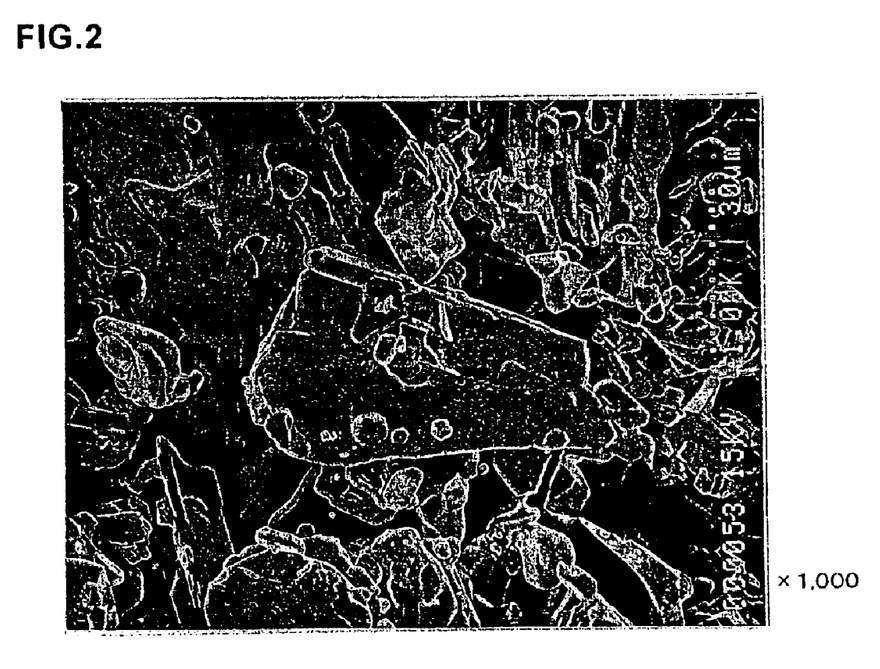
FIG. 2 is a photograph taken with a scanning electron microscope (with a magnification of ×1000) showing a sectional view of a molded body obtained in a comparative example.
Figure 3:
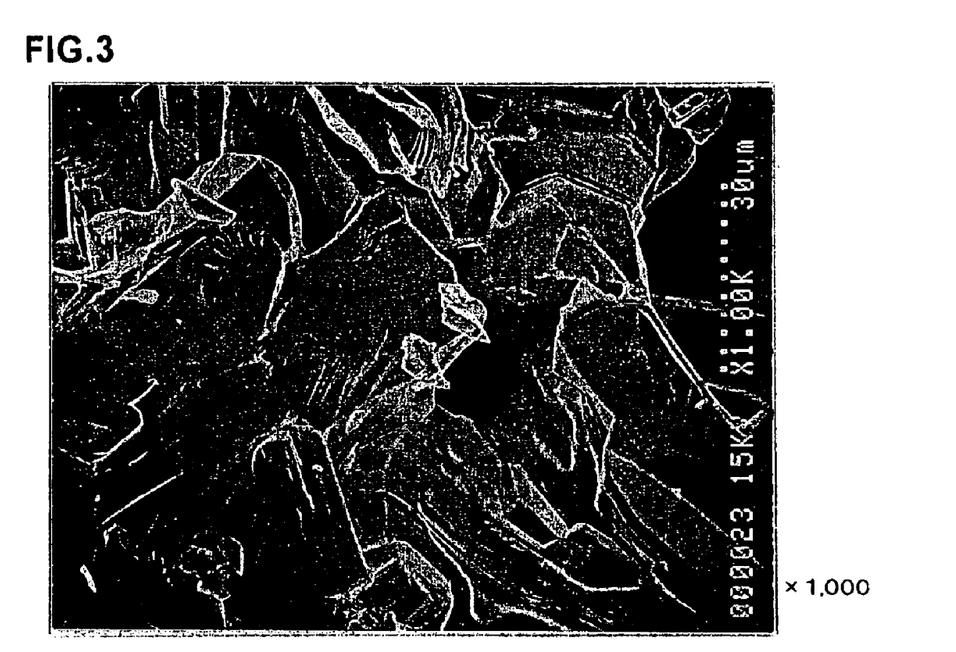
FIG. 3 is a photograph taken with a scanning electron microscope (with a magnification of ×1000) showing a sectional view of a molded body obtained in another comparative example.

FIG. 2 shows a sectional view of the molded body sintered at 1100° C. and FIG. 3 shows a sectional view of the molded body sintered at 1300° C. Magnifications of photographs are both at ×1000. As are clear from FIGS. 2 and 3, no presence of fine particles each of 1 μm or less in diameter are recognized in any of the molded bodies sintered at 1100° C. and 1300° C. From this fact, it is considered that in an oxide magnetic material of the present invention, a good high-frequency characteristic is achieved by the presence in a mixed condition of fine particles each of 1 μm or less in diameter.

Figure 4:
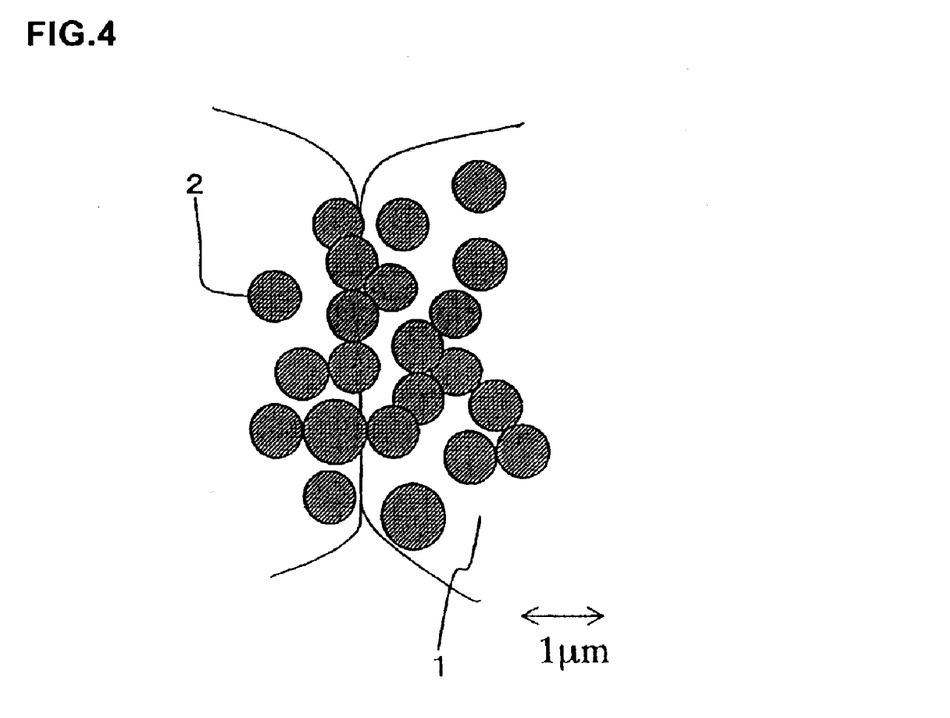
FIG. 4 is a schematic view showing an oxide magnetic material of the present invention.

FIG. 4 is a schematic view showing a state shown in the SEM photograph of FIG. 1. In an oxide magnetic material of the present invention, as shown in FIG. 4, it is considered that magnetic loss in high frequency is reduced by the presence of fine particles 2 each of 1 μm or less in diameter together with particles 1 larger in diameter.

The remaining half of the above obtained oxide magnetic material powder was added with a PVA base binder together with an organic solvent so that a content of the PVA base binder is 5 wt. %, followed by blending in a ball mill to prepare a slurry. With the slurry, green sheets each of a desired thickness were formed by means of a doctor blade. An Ag paste was printed on each of the green sheets by a printing method to form a desired passive circuit. The plural green sheets were stacked with each other and pressed by a hydraulic press, followed by a main sintering at 900° C. to prepare a stacked inductor. The obtained stacked inductor was confirmed to have a good high-frequency characteristic. (Experiment 2)

Powder of oxide magnetic material was prepared similarly to the procedure in Experiment 1 except that the blended powder was preliminarily sintered at 900° C., 1000° C., 1100° C., 1200° C., or 1300° C. Each obtained powder was molded into a ring-shaped body, which was then sintered at 900° C. for 2 hours to obtain a ring-shaped sample, similarly to the procedure in Experiment 1. The preliminarily sintering was kept for 2 hours similarly to Experiment 1.

The obtained ring-shaped sample was subjected to measurement on magnetic permeability with an impedance analyzer.

Figure 10:
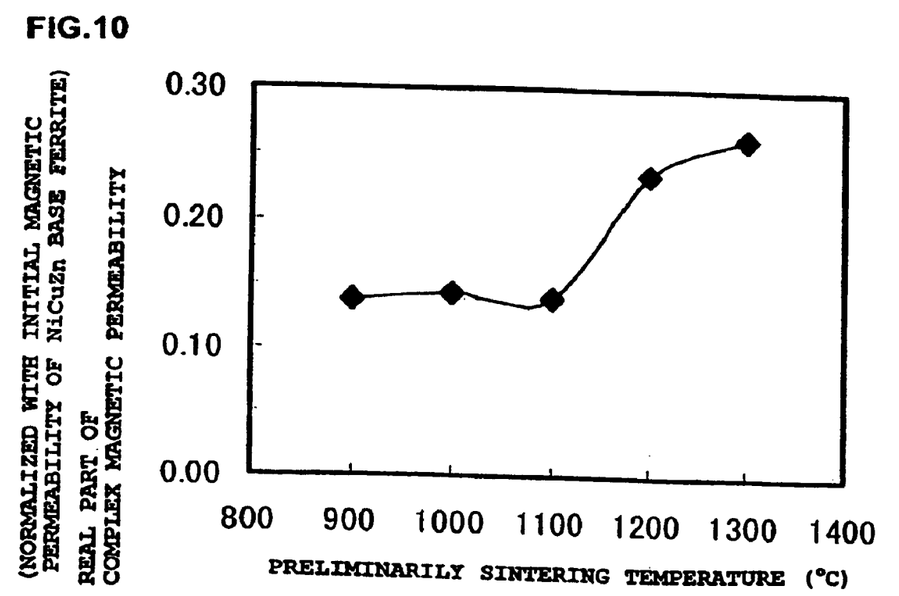
FIG. 10 is a graph showing magnetic permeability of each oxide magnetic material obtained when a sintering temperature is 900° C. and a preliminarily sintering temperature is varied in the range of 900° C. to 1300° C.

FIG. 10 is a graph showing measurment results of magnetic permeability. In FIG. 10, values of magnetic permeability are normalized with an initial magnetic permeability of NiCuZn base spinel ferrite as 1.

As seen from FIG. 10, preliminarily sintering at a temperature of 1200° C. or more provides the improvement in a real part of magnetic permeability. Accordingly, it is understood that a temperature of preliminarily sintering is preferably higher than a temperature of the subsequent sintering by 300° C. or more.

A section of each molded body was observed with a scanning electron microscope to measure a mean diameter of the particles each of more than 1 μm in diameter. The measurement results are shown in Table 1.

TABLE 1

| Preliminarily Sintering Temperature (° C.) | Mean Diameter of Particles of more than 1 μm in Diameter (μm) |
|---|---|
| 900 | 6 |
| 1000 | 6 |
| 1100 | 8 |
| 1200 | 12 |
| 1300 | 30 |

As seen from Table 1, when sintered at 1200° C. or 1300° C., a mean diameter of the particles each of more than 1 μm in diameter is 10 μm or more. Accordingly, it is understood that a mean diameter of the particles each of more than 1 μm in diameter is preferably 10 μm or more.

Further, the volume ratio of the particles each of 1 μm or less in diameter relative to the whole particles was measured in each molded body. The measurement results are shown in Table 2.

TABLE 2

| Preliminarily Sintering Temperature (° C.) | Volume Ratio of Particles of 1 μm or less in Diameter (vol. %) |
|---|---|
| 900 | 18 |
| 1000 | 14 |
| 1100 | 12 |
| 1200 | 11 |
| 1300 | 15 |

As seen from the results shown in Table 1, in any cases, the particles each of 1 μm or less in diameter are present in the amount of 10 vol. % or more.

In the above examples, while an oxide magnetic material of the present invention is blended with a binder, followed by molding, magnetic material powder may be mixed with resin or the like, followed by molding to obtain a magnetic body.

Furthermore, a glass component such as borosilicate glass or a low melting point oxide such as $Bi_2O_3$ may also be added into an oxide magnetic material of the present invention.

According to a production process of the present invention, there can be produced an oxide magnetic material, which is a hexagonal ferrite, small in loss in a high-frequency band at a low sintering temperature. Accordingly, there can be provided an oxide magnetic material, small in loss in the GHz band, capable of being sintered in the co-existence of a conductor of Ag, Cu or the like. Therefore, an oxide magnetic material of the present invention is suitable for application to a stacked composite device, a stacked inductor, an LC filter, an RF module and others.

What is claimed is:

1. An oxide magnetic material comprising a sintered blended material of a hexagonal ferrite including Co, Cu, Fe, O, and at least one element selected from the group consisting of Ba, Sr and Ca, with characteristics as result from a blended raw material being pre-sintered at a pre-sintering temperature in a range from above 1200° C. to 1300° C., then pulverized, and then sintered at a sintering temperature below 1000° C., wherein said pre-sintering temperature is at least 300° C. higher than said sintering temperature.

2. The oxide magnetic material according to claim 1, having a real part of a complex magnetic permeability larger than an imaginary part thereof at 1 GHz.

3. The oxide magnetic material according to claim 1, comprising particles each of 10 μm or more in diameter and particles each of 1 μm or less in diameter in a mixed condition.

4. The oxide magnetic material according to claim 1, comprising particles each of 1 μm or less in diameter in the amount of 10 vol. % or more.

5. A method of producing the oxide magnetic material according to claim 1, comprising the steps:

a) providing said blended raw material as a blended raw material powder having a composition of a hexagonal ferrite including Co, Cu, Fe, O, and at least one element selected from the group consisting of Ba, Sr and Ca;

b) preliminarily sintering at said pre-sintering temperature and then pulverizing said blended raw material powder; and c) after said step b) sintering said blended raw material powder at said sintering temperature below 1000° C. to produce therefrom said sintered blended material.

6. The oxide magnetic material according to claim 1, wherein said pre-sintering temperature is at least 1225° C.

7. The method according to claim 5, wherein said composition of said blended raw material power in said step a) has an elemental molar ratio of A : Co + Cu : Fe : O being in a range of 1 to 6 : 1 to 6 : 30 to 38 : 57 to 60, wherein said A represents said at least one element selected from said group consisting of Ba, Sr, and Ca.

8. An oxide magnetic material comprising a sintered blended material of a hexagonal ferrite including Co, Cu, Fe, O, and at least one element A selected from the group consisting of Ba, Sr and Ca, with characteristics as result from a raw material powder having an elemental molar ratio of A : Co+ Cu : Fe : O in a range of 1 to 6:1 to 6:30 to 38:57 to 60 being pre-sintered at a pre-sintering temperature in a range from above 1200° C. to 1300° C., then pulverized, and then sintered at a sintering temperature that is lower than 1000° C. and at least 300° C. lower than said pre-sintering temperature.

9. The oxide magnetic material according to claim 8, having a real part of a complex magnetic permeability larger than an imaginary part thereof at 1 GHz.

10. The oxide magnetic material according to claim 8, comprising particles each of 10 μm or more in diameter and particles each of 1 μm or less in diameter in a mixed condition.

11. The oxide magnetic material according to claim 8, comprising particles each of 1 μm or less in diameter in the amount of 10 vol. % or more.

12. A method of producing the oxide magnetic material according to claim 8, comprising the steps:
   a) providing said raw material powder as a blended raw material powder having a composition of a hexagonal ferrite including Co, Cu, Fe, O, and at least one element A selected from the group consisting of Ba, Sr and Ca, wherein said composition has an elemental molar ratio of A : Co + Cu : Fe : O in a range of 1 to 6 : 1 to 6 : 30 to 38 : 57 to 60;
   b) preliminarily sintering said blended raw material powder at a pre-sintering temperature to produce a pre-sintered powder;
   c) pulverizing said pre-sintered powder to produce a pulverized powder; and
   d) sintering said pulverized powder at a sintering temperature that is lower than 1000° C. and at least 300° C. lower than said pre-sintering temperature, to produce therefrom said sintered blended material.

13. The oxide magnetic material according to claim 8, wherein said pre-sintering temperature is at least 1225°C.

* * * * *

UNITED STATES PATENT AND TRADEMARK OFFICE
CERTIFICATE OF CORRECTION

| | |
|---|---|
| PATENT NO. | : 7,163,667 B2 |
| APPLICATION NO. | : 10/346938 |
| DATED | : January 16, 2007 |
| INVENTOR(S) | : Umemoto et al. |

It is certified that error appears in the above-identified patent and that said Letters Patent is hereby corrected as shown below:

<u>Title page</u>,
Item [56], Foreign Patent Documents,
following line 4, insert a new line --CN   1208020  2/1999--;

<u>Column 7</u>,
Line 14, after "A :" replace "Co+" by --Co +--;
Line 14, after "range of 1 to" replace
    "6:1 to 6:30 to 38:57" by --6 : 1 to 6 : 30 to 38 : 57--.

Signed and Sealed this

Third Day of February, 2009

JOHN DOLL
*Acting Director of the United States Patent and Trademark Office*